UNITED STATES PATENT OFFICE 2,403,763

DI-CYCLOHEXYL AMINE SALT OF ACID PHOSPHATE DI-ESTERS

Herschel G. Smith, Wallingford, and Troy L. Cantrell, Lansdowne, Pa., assignors to Gulf Oil Corporation, Pittsburgh, Pa., a corporation of Pennsylvania No Drawing. Application March 19, 1945, Serial No. 583,653

12 Claims. (Cl. 260—461)

This invention relates to di-cyclohexyl amine salts of acid phosphate di-esters, and it comprises oil-soluble, substantially neutral addition products of di-cyclohexyl amine and acid phosphate di-esters of alkylated phenols, said neutral addition products being useful as rust preventive compounds or rust inhibitors; and it further comprises methods of making said neutral addition products wherein the said acid phosphate di-esters and di-cyclohexyl amine are chemically combined together, in approximately equimolecular ratios, to produce neutral addition products having a pH between 5.5 and 7.5, said addition products or amine salts being readily soluble in and miscible with hydrocarbons, such as volatile hydrocarbon solvents, mineral oils, waxes and the like; all as more fully hereinafter described and claimed.

This application is a continuation-in-part of our prior copending application Serial No. 504,056, filed September 27, 1943. In our prior application, we have described improved anti-rust petroleum lubricants and mineral oil compositions containing minor amounts of the substantially neutral addition products of di-cyclohexyl amine and acid phosphate di-esters of alkylated phenols as rust inhibitors or rust preventive compounds. The present application is directed to such rust inhibitors or rust preventive compounds, per se.

That is, the present invention relates to new oil-soluble, substantially neutral addition salts of di-cyclohexyl amine and acid phosphate di-esters of alkylated phenols. Generically, these neutral addition salts may be represented by the following formula:

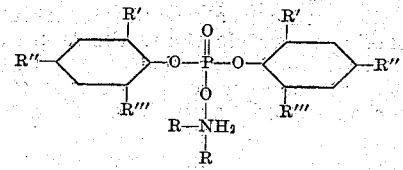

wherein R represents cyclohexyl group and R′, R″ and R‴ represent hydrogen or an alkyl group, at least one branched chain alkyl group being present.

As a class, the above amine salts are relatively non-volatile, even at elevated temperatures. Most of them are oily, viscous liquids at room temperatures. Others are soft, waxy solids which melt to oily liquids at slightly elevated temperatures. All of them are insoluble in water and aqueous liquids and are resistant to hydrolysis. Indeed, these oily and waxy amine salts are quite water-repellent. Also, they are relatively stable compounds. For instance, they can be heated to elevated temperatures as stated ante, and this is frequently done in incorporating them in waxes, petrolatum and mineral oils. However, if heated to excessive temperatures, say 260° F. or above, for long periods, they become converted into corresponding amide compounds, water being split off at such higher temperatures.

Generically, our new amine salts are readily soluble in oils, both mineral oils and fatty oils. Of course, their solubility varies somewhat with a particular oil and amine salt, but is quite high in general. Further, in addition to being readily soluble in mineral oils, they are readily miscible with other hydrocarbons, such as petrolatums, waxes and volatile hydrocarbon liquids, and coating compositions containing the same; they being readily soluble in hydrocarbon liquids, particularly volatile hydrocarbon solvents. When incorporated in hydrocarbons, such as mineral oils and the like, they impart marked anti-rust qualities thereto, as shown in our prior application Serial No. 504,056. In other words, as described and illustrated in that application, our new di-cyclohexyl amine salts are excellent rust preventive compounds or rust inhibitors.

The di-cyclohexyl amine, employed as one reactant, is a well-known chemical compound commercially available as a substantially pure material. This amine is a secondary amine, having a boiling point of 493° F. and a melting point of 32° F. It is readily soluble in mineral acids and light hydrocarbons. In preparing our amine salts from this amine, we may use the "C. P." amine; and this was usually done when a pure amine salt was desired. However, it is not necessary to use a "C. P." amine. Indeed, in commercial practice, we usually employ the commercial grades of this amine, which are readily available as substantially pure materials.

The di-cyclohexyl amine readily reacts with the 3-methyl-butyl, 2-ethyl-hexyl ortho phosphoric acid; the reaction being quite exothermic, as shown in our prior application Serial No. 504,056. As there stated, in making our rust inhibitors from these reagents, the reaction temperature is carefully controlled. Usually, the reaction temperature is held between 140° F. and 200° F.; the reaction mixture being externally controlled, if necessary.

The other reactant, the acid phosphate esters are di-esters of ortho phosphoric acid and may be represented by the following generic formula:

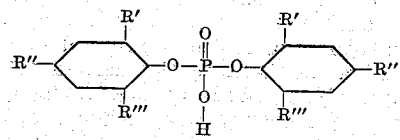

wherein R′, R″ and R‴ represent hydrogen or an alkyl group, at least one branched chain alkyl group being present.

These acid phosphate esters can be prepared by various methods from alkylated phenols containing one or more branched chain alkyl groups attached to the phenyl nucleus in the positions indicated ante.

In particular, the acid phosphate di-esters of 4-tertiary-butyl phenyl, 2-tertiary-butyl-4-secondary butyl phenol, 2,4-di-tertiary-butyl phenol, 2,6-di-tertiary-butyl-4-secondary-butyl phenol, 2,4,6-tri-tertiary-butyl phenol, 2,6-di-tertiary-butyl-4-methyl phenol, and 4,6-di-tertiary-butyl-2-methyl phenol are advantageous for the present purposes. For instance, as shown in the illustrated examples post, di-(2,4,6-tri-butyl-phenyl) phosphate and di-(2,4-di-tertiary-butyl-phenyl) phosphate are advantageous in preparing our rust inhibitors.

These two acid phosphate di-esters are viscous oily liquids at room temperature and are readily soluble in mineral oils. Accordingly, mineral oil solutions of these acid phosphate esters may be employed in preparing concentrates of our rust inhibitors in oil; the amine being added to such oil solutions and reacted with the acid phosphate esters dissolved therein to form the rust inhibitor in situ in the oil. In general, acid phosphate di-esters of alkylated phenols containing tertiary or secondary alkyl groups are useful and advantageous in preparing our rust inhibitors; those containing a plurality of such branched chain alkyl groups being particularly advantageous for the present purposes. Such acid phosphate di-esters are readily soluble in mineral oils and have other properties rendering them advantageous for the purposes of this invention.

As a class, these acid phosphate di-esters of alkylated phenols containing branched chain alkyl groups react readily with di-cyclohexyl amine. In general, the reaction is exothermic and is quite vigorous in most cases. In preparing our rust inhibitors, the reaction temperature is controlled by suitable means to secure smooth reaction and obtain addition products of the amine and acid phosphate ester. In doing so, the temperature of the reaction mixture is controlled by cooling or heating as required; the temperature of the reaction mixture being maintained below 180° F. to avoid splitting out water from the mixture. The reaction temperature is usually maintained between 140 and 170° F. during the larger portion of the reaction and within this range excellent rust inhibitors are obtained; the pH value of the reaction product being adjusted in the final stages of the reaction within the desired range stated ante.

The following examples illustrate advantageous methods of preparing these rust inhibitors:

*Example I.*—To a suitable kettle equipped with heating and cooling coils and means for mechanical agitation, there were added 181 pounds of commercial di-cyclohexyl amine and then 586 pounds of di-(2,4,6-tri-tertiary-butyl-phenyl) phosphate were slowly added, the said acid phosphate being gradually added at such rate as to keep the temperature of the reaction mixture below 180° F. whereby to avoid splitting out water from the mixture. After the addition of the acid phosphate, the mixture had a pH of 4.1 and was brought to the desired pH of 7.3 by adding 14.0 pounds of di-cyclohexyl amine and stirring the final mixture for one hour.

The substantially neutral reaction product so obtained is a heavy viscous oily liquid when cooled to room temperature. This reaction product or rust inhibitor was light amber red in color and had a pleasant odor. It was sufficiently soluble in mineral oils for the present purposes.

Similar viscous oily rust inhibitors can be readily obtained having other pH values within the range of 5.5 to 7.5, by controlled adjustment of the pH during the last stages of the reaction. Likewise, our oily rust inhibitors also can be prepared from other acid phosphate di-esters of alkylated phenols as well as from the particular acid phosphate employed in Example I. The preparation of other such advantageous rust inhibitors is illustrated in the following example.

*Example II.*—Here again, the reaction is carried out in a suitable kettle equipped with means for heating and cooling and for agitating the mixture.

Into such a kettle there were introduced 181 pounds of commercial di-cyclohexyl amine and then 474 pounds of di-(2,4-di-tertiary-butyl-phenyl) phosphate were gradually added with stirring. The reaction was vigorous and quite exothermic and the acid phosphate was added at such a gradual rate as to facilitate maintaining the reaction temperature below 180° F., the reaction mixture being cooled if desired to maintain it below that temperature. In this way, the reaction temperature was maintained between 140 and 170° F. during the larger portion of the reaction. After all the acid phosphate had been added, the mixture was warmed to facilitate completion of the reaction. At this stage the reaction mixture had a pH between 3 and 4 and the final adjustment and control of the pH value was then effected. In doing so, 16.0 pounds of di-cyclohexyl amine were added and the mixture further heated with stirring until the reaction product had a pH of approximately 6.8.

The rust inhibitor so obtained was a heavy viscous oily liquid when cooled to room temperature and was sufficiently soluble in mineral oils for making our improved compositions.

In other words, the substantially neutral reaction products obtained in Examples I and II, respectively, like the amine and acid phosphate esters from which they were prepared, are soluble in mineral oil. Accordingly, we sometimes prepare concentrated solutions of these rust inhibitors in mineral oils by forming them in situ in the oil. In such processes, the amine is first dissolved in the mineral oil and then the acid phosphate ester added, the mixture being stirred and maintained at the desired temperature until the reaction is complete, and the mixture has a pH value within the specified range. In preparing such oil concentrates of our rust inhibitors sometimes additional amine is added in the later stages to adjust the pH value as desired. The concentrates or oil solutions of neutral reaction products so obtained are useful addition agents to various types of lubricants. The preparation of such concentrates is illustrated in the following example:

*Example III.*—780 pounds of light mineral lubricating oil having a viscosity of 100 seconds SUV at 100° F. were added to an iron vessel equipped with means for heating and cooling and agitation. The initial temperature of the oil was 80° F. To this oil were added 181 pounds of di-cyclohexyl amine, which was thoroughly mixed with the oil by mechanical agitation and the final temperature of this mixture was 82° F. To the oil-amine mixture, 586 pounds of di-(2,4,6-tri-tertiary-butyl-phenyl) phosphate were added over a period of two hours, during which time the mixture was agitated and the temperature of the reaction mixture rose to 178° F. After stirring for one hour, the pH of the mixture was 4.8. In order to increase this value to the desired range, 6.0 pounds of di-cyclohexyl amine were added to the mixture and stirred and the resultant mixture had a pH of 6.1. To secure a final adjustment, 7.0 additional pounds of di-cyclohexyl amine were added to the mixture which after stirring for one hour and cooling to room temperature had a pH of 7.4.

The oily mixture prepared in this Example III can be regarded as a sort of concentrated solution which can be stored indefinitely and incorporated in lubricating oils as desired to prepare commercial anti-rust oils and improved lubricants.

In general, the rust inhibitors or reaction products prepared as described ante, may be dissolved in various types of mineral oils and improved anti-rust and non-corrosive oil compositions obtained which are capable of inhibiting or retarding the rusting of various metals as described.

What we claim is:

1. As new compositions of matter, useful as rust preventive compounds and for other purposes, the oil-soluble addition salts having the following formula:

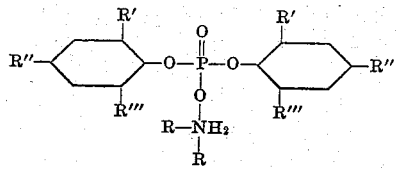

wherein R represents a cyclohexyl group and R', R" and R'" represent a substituent selected from the class consisting of hydrogen and an alkyl group, at least one branched chain alkyl group being present, said amine salt being a substantially neutral compound soluble in mineral oils and miscible with hydrocarbons.

2. The composition of claim 1 wherein said addition salt is the di-cyclohexyl amine salt of di-(2,4,6-tri-tertiary-butyl-phenyl) phosphate.

3. The composition of claim 1 wherein said addition salt is the di-cyclohexyl amine salt of di-(2,4-di-tertiary-butyl-phenyl) phosphate.

4. As new compositions of matter, the oil-soluble, addition salts of di-cyclohexyl amine and acid phosphate di-esters of 2,4,6-tri-alkylated phenols containing at least one branched chain alkyl group, said di-cyclohexyl amine salts being substantially neutral compounds soluble in mineral oils and miscible with hydrocarbons.

5. As new compositions of matter, the oil-soluble addition salts of di-cyclohexyl amine and acid phosphate di-esters of 2,4-di-alkylated phenols containing at least one branched chain alkyl group, said di-cyclohexyl amine salts being substantially neutral compounds soluble in mineral oils and miscible with hydrocarbons.

6. As an improvement in the manufacture of oil-soluble, rust preventive compounds from acid phosphate di-esters of alkyl-phenols having the following formula:

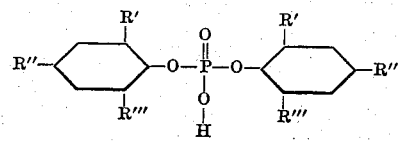

wherein R', R" and R'" represent a substituent selected from the class consisting of hydrogen and an alkyl group, at least one branched chain alkyl group being present, the improved process which comprises reacting said acid phosphate di-esters and di-cyclohexyl amine, in substantially equimolecular proportions, while maintaining the reaction temperature below 200° F., to produce substantially neutral addition products thereof.

7. The process of claim 6 wherein the reaction is effected at temperatures between 140° and 200° F.

8. As an improvement in the manufacture of oil-soluble, rust preventive compounds, the improved process which comprises reacting di-cyclohexyl amine with acid phosphate di-esters of 2,4,6-tri-alkylated phenols containing at least one branched chain alkyl group, at temperatures between 140° and 200° F., the said amine and acid phosphate ester being reacted and combined in substantially equimolecular proportions to form substantially neutral addition products thereof.

9. The process of claim 8 wherein said acid phosphate di-ester is di-(2,4,6-tri-tertiary-butyl-phenyl) phosphate.

10. The process of claim 8 wherein said acid phosphate di-ester is di-(2,6-di-tertiary-butyl-4-methyl-phenyl) phosphate.

11. As an improvement in the manufacture of oil-soluble, rust preventive compounds, the improved process which comprises reacting di-cyclohexyl amine with acid phosphate di-esters of 2,4-di-alkylated phenols containing at least one branched chain alkyl group, at temperatures between 140° and 200° F., the said amine and acid phosphate ester being reacted and combined in substantially equimolecular proportions to form substantially neutral addition products thereof.

12. The process of claim 12 where said acid phosphate di-ester is di-(2,4-di-tertiary-butyl-phenyl) phosphate.

HERSCHEL G. SMITH.
TROY L. CANTRELL.